United States Patent [19]

Johnston

[11] Patent Number: 4,652,802
[45] Date of Patent: Mar. 24, 1987

[54] ALTERNATOR CIRCUIT ARRANGEMENT USEFUL IN LIQUID LEVEL CONTROL SYSTEM

[75] Inventor: Stephen P. Johnston, Detroit Lakes, Minn.

[73] Assignee: S. J. Electro Systems, Inc., Detroit Lakes, Minn.

[21] Appl. No.: 868,642

[22] Filed: May 29, 1986

[51] Int. Cl.$^4$ ............................................. F04B 41/06
[52] U.S. Cl. .................................. 318/482; 318/103; 417/36; 417/40; 137/395; 307/41; 361/167
[58] Field of Search ............... 318/101, 102, 103, 482; 137/395; 417/8, 36, 40, 63; 307/11, 38, 41; 361/166, 167, 189, 191

[56] References Cited

U.S. PATENT DOCUMENTS

| | | | |
|---|---|---|---|
| 2,949,126 | 8/1960 | Kuntz et al. | 137/207 |
| 3,285,181 | 11/1966 | Howard | 417/8 |
| 3,368,472 | 2/1968 | Bouwel et al. | 417/40 |
| 3,540,027 | 11/1970 | Rauth et al. | 340/620 |
| 3,741,683 | 6/1973 | McTamaney et al. | 318/102 X |
| 3,800,205 | 3/1974 | Zalar | 318/482 |
| 4,265,262 | 5/1981 | Hotine | 417/36 X |
| 4,291,261 | 9/1981 | Johnston | 318/482 |
| 4,341,983 | 7/1982 | Gottliebson | 318/102 |
| 4,437,811 | 3/1984 | Iwata et al. | 417/8 |
| 4,444,545 | 4/1984 | Sanders et al. | 417/8 |
| 4,551,068 | 11/1985 | Boudreaux | 417/8 |

Primary Examiner—William M. Shoop, Jr.
Assistant Examiner—Bentsu Ro
Attorney, Agent, or Firm—Merchant, Gould, Smith, Edell, Welter & Schmidt

[57] ABSTRACT

Alternator circuit arrangement (20) for controlling the electrical energization of multiple load devices such as two pump motors (41,42) on an alternating basis so as to maintain the level of a liquid (86) in a container (84) within a predetermined range. The alternator circuit arrangement (20) further including an RC circuit (54) having a capacitor (62) for discharging through a normally closed switch (50b) which is opened during energization of the pump motors (41,42) so as to energize a bi-stable relay (52) which in turn interconnects alternate ones of the pump motors (41,42) to the alternator circuit (20) such that upon detection of the liquid (86) at an intermediate level (96) alternate ones of the pumps (41,42) are energized.

6 Claims, 7 Drawing Figures

ALTERNATOR CIRCUIT ARRANGEMENT USEFUL IN LIQUID LEVEL CONTROL SYSTEM

BACKGROUND OF THE INVENTION

The present invention relates to the field of electrical engineering and, in particular, to a circuit arrangement for controlling the electrical energization of multiple load devices such as the motors of two pumps for maintaining the level of a liquid in a container within a predetermined range.

In a typical alternator circuit arrangement, solid state driven alternating relays are used. These relays are rather expensive and contain numerous components which are subject to malfunction. Also, in alternator circuit arrangements such as U.S. Pat. No. 3,285,181 to Howard, there is a problem of short cycling as the liquid level fluctuates if liquid level sensitive switches are used which do not latch.

The present invention solves these and other problems associated with the prior art.

BRIEF SUMMARY OF THE INVENTION

The invention relates to an apparatus for maintaining the level of liquid in a container between first and second levels comprising first and second pump means for causing flow of the liquid with respect to the container. First electric motor means is associated with said first pump means, and second electric motor means is associated with said second pump means, each of said first and second electric motor means being energizable for causing operation of said first and second pump means, respectively. The apparatus includes control means for controlling energization of said first and second motor means. Stop switch means is responsive to the liquid at a first level in the container. Lag switch means is responsive to the liquid at a second level in the container. Lead switch means is responsive to the liquid at a third level, intermediate of the first and second levels, in the container. First circuit means is provided for supplying electrical energy from a source to said first and second electric motor means through said stop switch means and said lead switch means in series, so that initial energization of one of said first and second electric motor means as the liquid reaches the third intermediate level is accomplished by the closing of said stop switch means and said lead switch means in series. Said first circuit means supplies electrical energy from the source to first relay means through said stop switch means and said lead switch means in series, so that initial energization of said first relay means as the liquid reaches the third intermediate level is accomplished by the closing of said stop switch means and said lead switch means in series. Said first relay means upon energization latching closed normally open first relay contacts means in parallel with said lead switch means and in series with said stop switch means, whereby energization of one of said first and second electric motor means is maintained after initial energization thereof, even though the lead switch means may be opened after the energization of said first relay means. Initial deenergization of said energized one of said first and second electric motor means is accomplished by the opening of said stop switch means. Alternating means is provided for alternately interconnecting alternate ones of said first and second electric motor means in series with said stop switch means and said normally open first relay contacts means, whereby alternating ones of said first and second motor means are energized. Said alternating means including said first circuit means supplying electrical energy from the source through said stop switch means and said normally open first relay contacts means in series with RC circuit means for charging of capacitive means during energization of one of said first and second electric motor means. The RC circuit means is interconnected to bi-stable second relay means by normally closed first relay contacts means, said normally closed first relay contacts means being latched open during energization of said first relay means so as to be in an open state and being closed upon deenergization of said first relay means so as to be in a closed state, whereby said bi-stable second relay means is energized upon deenergization of said energized one of said first and second electric motor means. Said bi-stable second relay means being interconnected to means for switching said first circuit means to an alternate one of said first and second motor means upon energization of said bi-stable second relay means.

A particularly advantageous feature of the present invention is the use of an RC circuit and bi-stable relay arrangement for alternating pump motors once they have been shut off. This approach results in a very inexpensive alternator circuit and one having relatively few parts which might be otherwise subject to failure.

Another advantage of the present invention is the use of a circuit maintaining arrangement which allows the present invention to be used with liquid level sensitive switches such as mercury switches, so as to prevent any on/off short cycling problems or any interference due to turbulence at the surface of the liquid.

In the preferred embodiment of the present invention, an added safety margin is provided in that should the capacity of one of the pumps be exceeded, or one of the pumps fail, a second one of the pumps will be activated. The present invention provides a pumping system with extended life by reducing wear on the individual pumps.

Yet another advantage of the present invention is the separation of circuit making and circuit breaking functions from circuit maintaining functions. Relay contacts are used to perform only the latter function. Applicant's U.S. Pat. No. 4,291,261 separates the circuit making and breaking functions from the circuit maintaining function in a dual float, single pump arrangement.

These and various other advantages and features of novelty which characterize the invention are pointed out with particularity in the claims annexed hereto and forming a part hereof. However, for a better understanding of the invention, its advantages, and objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the drawings, in which like numerals indicate corresponding parts throughout.

DETAILED DESCRIPTION OF A PREFERRED EMBODIMENT OF THE INVENTION

U.S. Pat. No. 4,291,261 commonly assigned to applicant is hereby incorporated by reference. U.S. Pat. No. 4,291,261 discloses a double float circuit which controls one pump.

For purposes of this description, wherein relays are utilized, the relay coil winding and armature is represented by a circle, and the relay contacts are illustrated apart therefrom.

Figures 1, 3, 4:
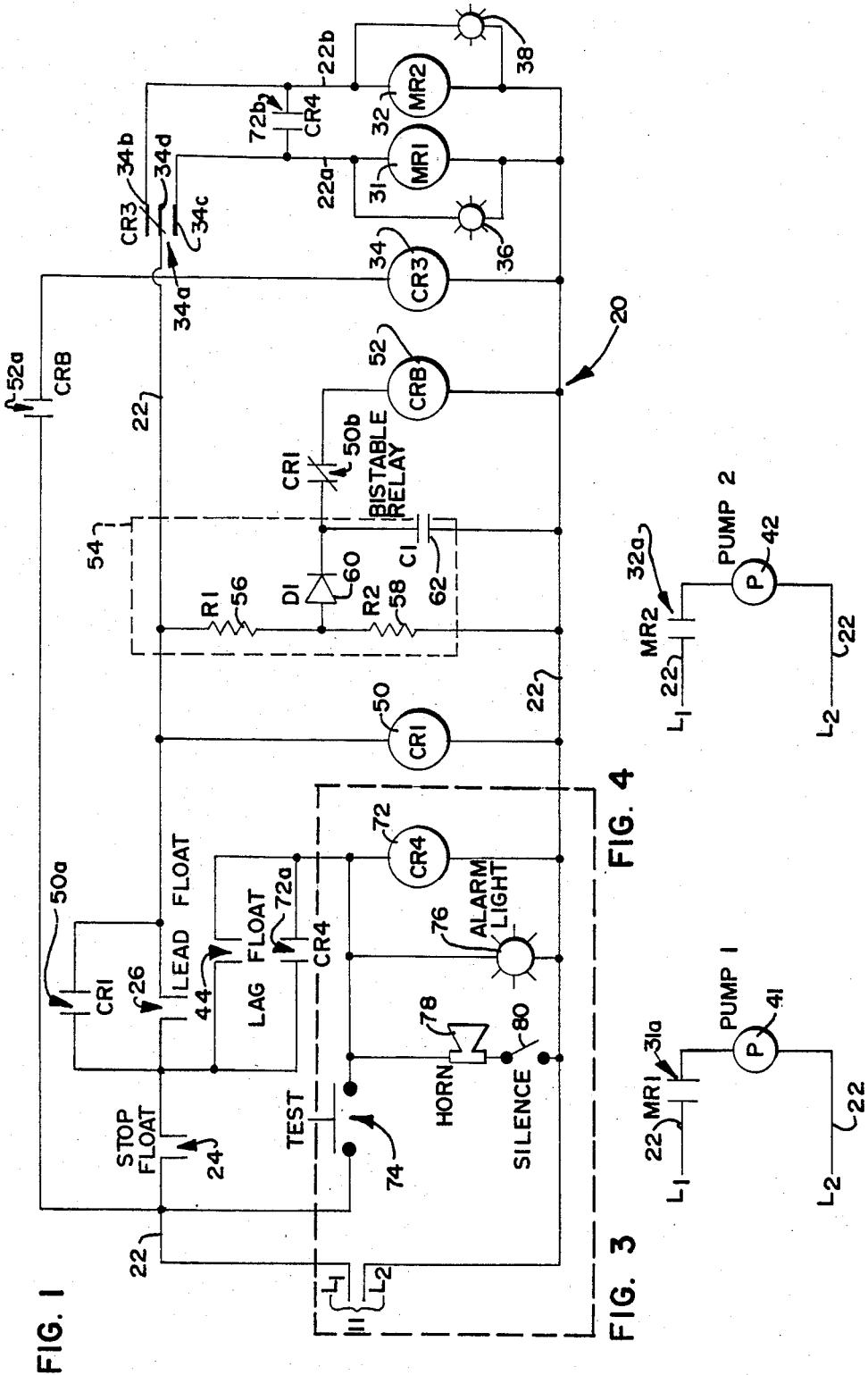
FIG. 1 is a schematic of an embodiment of the present invention applied in a liquid level control system.
FIG. 3 is a circuit diagram for pump 1.
FIG. 4 is a circuit diagram for pump 2.

FIG. 1 illustrates an embodiment of a circuit 20 in accordance with the principles of the present invention. The circuit 20 may be traced from a source 11 of electrical energy along a conductor 22 through a normally open stop float switch 24 and a normally open lead float switch 26 to one of two pump motor relays 31,32 and then back to the source 11 of electrical energy. As illustrated in FIG. 1 and FIGS. 3 and 4, the circuit 20 is interconnected to the pump motor relays 31,32 which upon being energized, close normally open relay contacts 31a,32a associated with the pumps 41,42 respectively. As illustrated in FIG. 1, the pumps 41,42 might be associated with run lights 36,38 respectively which indicate when the pumps 41,42 are in operation. In the embodiment shown, the relay contacts 31a,32a and pumps 41,42 are isolated from the circuit 20, to allow interconnection to a separate source of electrical energy such as 120 volts or 230 volts. The circuit 20 shown is interconnected to 120 volts.

As further illustrated in FIG. 1, the circuit includes a first relay 50 operatively interconnected to normally open first relay contacts 50a and normally closed first relay contacts 50b such that upon energization of the first relay 50, the relay contacts 50a are latched closed and the relay contacts 50b are latched open. In addition, the circuit 20 includes a bi-stable second relay 52 interconnected to second relay contacts 52a which upon energization of the bi-stable relay 52 are latched closed or latched open depending on which state the bi-stable relay 52 is in. The bi-stable relay 52 is inter connected to an RC circuit 54 by the normally closed first relay contacts 50b. The RC circuit includes a resistor 56, a resistor 58, a diode 60, and a capacitor 62. The circuit 20 further includes a third relay 34 interconnected to normally open third relay contacts 34a, illustrated in an open position in FIG. 1 so as to electrically connect pump motor relay 32 to the control circuit 20. Upon energization of the third relay 34, the relay contacts 34a are switched to the closed state. The relay contacts 34a illustrated include stationary contacts 34b and 34c and a pole member 34d movable between the contacts 34b and 34c.

Also included is a fourth relay 72 interconnected to normally open fourth relay contacts 72a in series with the stop switch 24 and in parallel with a normally open lag float switch 44 in series with the stop float switch 24, and normally open fourth relay contacts 72b interconnecting conductors 22a,22b leading to the pump motor relays 31,32 respectively. Upon energization of the fourth relay 72, the normally open relay contacts 72a,b are latched closed. It will be appreciated that when relay contacts are referred to in the above disclosure, they may be the actual contacts of the relay device itself, or they may be a switch arrangement otherwise operated by the relay.

The circuit 20 is illustrated as including a test switch 74 for testing of an alarm light 76 and a horn 78, which are normally activated upon closure of the lag switch 44. A switch 80 is provided for disconnecting the horn 78 if desired.

Figure 5:
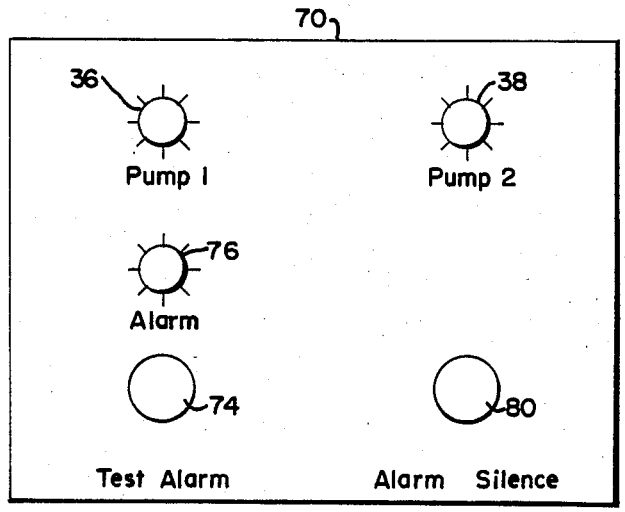
FIG. 5 is a diagrammatic view of a control panel in accordance with the principles of the present invention.

As illustrated in FIG. 5, the circuit 20, excluding the pumps 41,42 is enclosed in a housing having a front control panel 70. The front control panel 70 of the housing has the alarm test pushbutton switch 74 and the alarm silence pushbutton switch 80 mounted thereon. Also present on the front control panel are the pump run lights 36,38 and the alarm light 76. It will be appreciated, that the housing with its associated control panel 70 is preferably located so as to allow convenient access thereto.

Figure 2:
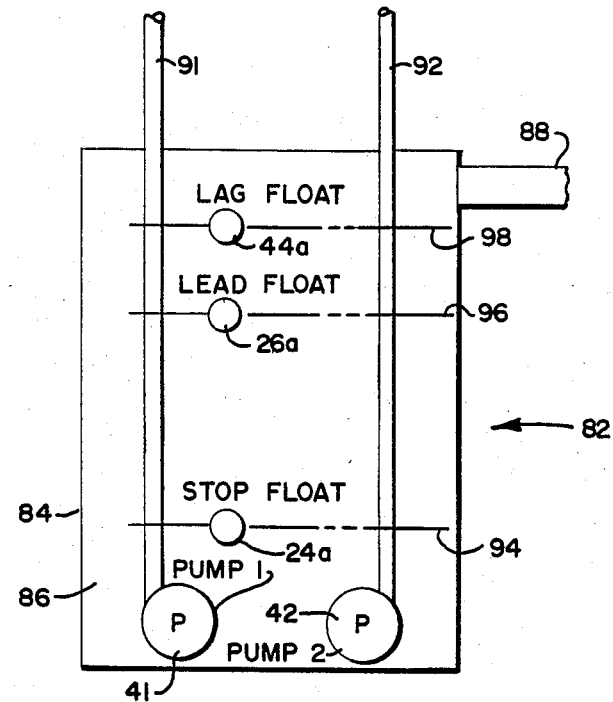
FIG. 2 is a circuit diagram illustrating an embodiment in accordance with the principles of the present invention.

Illustrated in FIG. 2 is a schematic showing the invention as applied in a liquid level control system 82 such as might be found in residential or commercial sewage use. The pumps 41,42 are positioned proximate the bottom of a container 84 holding a fluid 86. The pumps 41,42 are interconnected to conduits 91,92 respectively, for conveying liquid out of the container during operation of the pumps 41,42. The container 84 is interconnected to a conduit 88 providing for inflow of liquid such as sewage into the container 84. Suitably, pivotally mounted inside the container are a stop float 24a, a lead float 26a, and a lag float 44a. In the preferred embodiment shown, the floats 24a,26a,44a enclose the switches 24,26,44 respectively. The present invention can be used with mercury switches commonly used in the industry which are sensitive to slight variations in liquid level. Three different liquid levels are designated by line 94 designating a lower liquid level, line 96 designating an intermediate liquid level, and line 98 designating an upper liquid level. The switches 24,26,44 are responsive to each of the liquid levels 94,96,98 respectively, such that upon raising to their respective liquid levels, the normally open switches 24,26,44 are closed.

In operation, as the liquid level raises, the stop float 24a tips and the switch 24 closes. As the level of the liquid continues to raise, the lead float 26a tips and the switch 26 closes. Upon closure of the stop float switch 24 and the lead float switch 26, a completed circuit is made whereupon one of the pump motor relays 31,32 is energized thereby closing its associated relay contacts 31a,32a. In the normally open position the relay contacts will connect the pump motor relay 32 to the control circuit 20 and in the closed position, the relay contacts 34a will connect the pump motor relay 31 to the control circuit 20. Accordingly, the corresponding pump 41,42 will start. The first relay 50 is also energized causing the relay contacts 50a to latch closed and stay closed so long as the first relay 50 is energized. In addition, the relay contacts 50b are latched open and the capacitor 62 begins charging. As the liquid level decreases, the lead float 26a will pivot downward causing the lead float switch 26 to open. However, the relay contacts 50a are latched closed and are in parallel with the lead float switch 26 and in series with the stop float switch 24 such that the completed circuit is maintained so the pump will continue to run and decrease the liquid level until the liquid reaches the lower level 94 whereupon the stop float switch 24 will open. When the stop float switch 24 opens, the circuit is broken and the first relay 50 is deenergized whereupon the normally closed relay contacts 50b are closed. This allows the capacitor 62 to discharge through the bi-stable relay 52 thereby pulsing or energizing the bi-stable relay 52, causing it to change from one stable state to the other stable state. In one stable state, the relay contacts 52a are latched closed, permitting the third relay 34 to energize and thereby energize the pump motor relay 31 by causing the movable pole member 34d of the third relay contacts 34a to make contact with the contact 34c. In the other state of the bi-stable relay 52, the relay contacts 52a are latched open, causing the third relay 34 to be deenergized and thereby provide for energization of the pump motor relay 32 by causing the movable pole member 34d of the switch 34a to make contact with the contact 34b. This sequence establishes an alternating action between the pump motor relays 31,32. The present invention provides the alternating action with relatively few parts and at reduced cost.

Of course, in some special circumstances, the liquid level could continue to raise if the liquid was coming in faster than the single pump was pumping. Accordingly, the lag float 44a, upon detecting liquid at the upper level 98, will tip and close the lag float switch 44 whereupon the fourth relay 72 is energized and latches closed the normally open relay contacts 72a,72b such that both of the pump motor relays 31,32 are energized. In addition, both pumps 41,42 will stay energized until the lower liquid level 94 is detected whereupon the switch 24 is opened. Upon opening of the switch 24, the relay contacts 50a,72a,72b are also opened.

The present invention with its alternating action thus provides an added safety margin in that should the capacity of one of the pumps 41,42 be exceeded or one of the pumps 41,42 fail, a second one of the pumps 41,42 will be activated. Moreover, by alternating the pumps 41,42, the system is provided with extended life by reducing wear of individual ones of the pumps 41,42.

The circuit 20 illustrated in FIG. 1 includes an alarm function comprising the horn 78 and the alarm light 76 such that when the upper liquid level 98 is detected, the alarm function is activated. In the preferred embodiment illustrated, the switch 80 is provided for purposes of deactivating and/or silencing the horn 78. Furthermore, the switch 74 is provided to enable testing of the horn 78 and the alarm light 76 at any time.

It will be appreciated that the present invention has application beyond that of the embodiment described above. The present invention has utility for controlling any number of load devices such as air compressors, heaters, air conditioners, etc., wherein an alternating action is desired. In particular, the present invention might be used to maintain a liquid level by pumping liquid into the container as opposed to out of the container.

Figure 6:
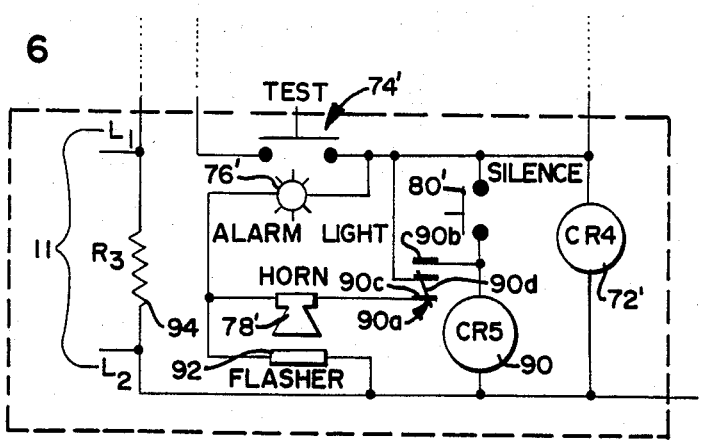
FIG. 6 is a partial circuit diagram of an alternate embodiment of the present invention.

Illustrated in FIG. 6 is an alternate embodiment of the alarm portion of the present invention. In the alternate embodiment, parts corresponding to those of FIGS. 1-5 are referenced by primed reference numerals corresponding to those of FIGS. 1-5. In this embodiment, the alarm silence switch 80' is interconnected in series with the relay contacts 72a and the stop float switch 24 to a fifth relay 90 which in turn operates fifth relay contacts 90a, the normally open position of the relay contacts 90a being illustrated in FIG. 6. The relay contacts 90a is similar to that of the relay contacts 34a having two stationary contacts 90b and 90c and a pole member 90d movable between the contacts 90b,90c. If the alarm silence switch 80' is closed while the horn 78' is activated, a completed circuit to the fifth relay 90 is provided whereby the fifth relay 90 is energized and causes the relay contacts 90a to close so as to disconnect the horn 78' from the source of electrical energy, whereupon the horn 78' is silenced. The fifth relay 90 remains energized until the stop switch 24 is opened, whereupon the normally open relay contacts 90a returns to the open condition. Accordingly, when the lag float switch 72a is subsequently closed again, the horn 78' will sound. This provides a built in safety feature since the alarm silence switch 80' does not permanently silence the horn 78'. In the embodiment shown, the fifth relay 90 has no effect on the alarm light 76' which will remain lit regardless of the state of the relay contacts 90a. It will be appreciated that this embodiment still provides for testing by the alarm test switch 74' and further provides for testing of the fifth relay 90 by simultaneously pressing the alarm test switch 74' and the alarm silence switch 80'. In addition, this embodiment includes a flasher device 92 for flashing the alarm light 76' and pulsating the horn 78' on and off. In addition, a resistor 94 is provided as a heating element to facilitate drying of the control circuitry.

Figure 7:
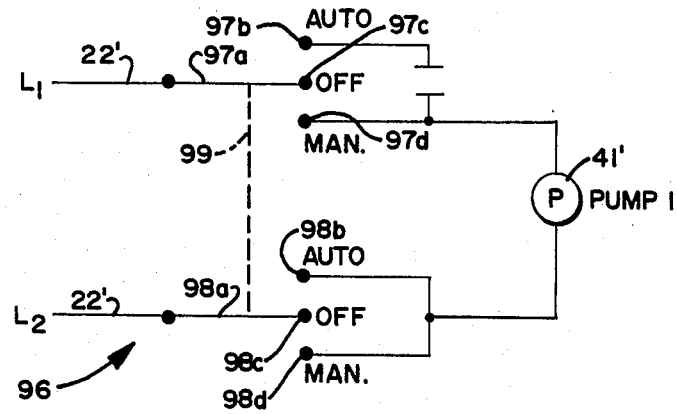
FIG. 7 is a partial circuit diagram of yet another alternate embodiment of the present invention.

Additionally illustrated in FIG. 7, is an alternate embodiment of the present invention wherein a three position HOA switch 96, where H stands for manual, 0 stands for off, and A stands for automatic, is provided for switching the pumps 41',42 to one of three states of operation: manual, off, or automatic. The switch 96 illustrated is typically referred to as a dual pole, dual throw, with center off switch. The switch 96 includes two movable pole members 97a,98a suitably interconnected by an appropriate linkage mechanism as indicated by broken line 99 and movable between contacts 97b,c,d and 98b,c,d respectively. When in the automatic setting, the control circuit 20 will automatically control operation of the pumps 41',42 alternating switching there between. In the off setting, the pumps 41',42 are electrically isolated from the control circuit 20. The off setting might be utilized when doing maintenance work on the pumps. In the manual setting, the pumps 41',42 will continuously run as might be the case wherein it was desired to continuously pump for a period of time. Preferably, the switch 96 will be located inside the control panel housing as typically it will only be used by someone doing maintenance work on the pumps. The switch 96, when in the off position, isolates both sides of the pump in view of the relatively high voltages that are being used by the control circuit in a typical application. Although the switch 96 is shown for only one pump 41', it will be appreciated that a similar arrangement can be established for pump 42.

It is to be understood, that even though specific numerous characteristics and advantages of the invention have been set forth in the foregoing description, together with details of the structure and function of the invention, the disclosure is illustrative only, and changes may be made in detail to the full extent indicated by the broad general meaning of the terms in which the appended claims are expressed.

What is claimed is:

1. An apparatus for monitoring the level of liquid in a container between upper and lower levels, comprising:
   (a) first and second pump means for causing flow of the liquid with respect to the container;
   (b) first motor means associated with said first pump means and second motor means associated with said second pump means, each of said first and second motor means being energizable for causing operation of said first and second pump means, respectively; and (c) control means for controlling energization of said first and second motor means, said control means including:
  (i) stop switch means responsive to the liquid at a first level in the container;
  (ii) lag switch means responsive to the liquid at a second level in the container;
  (iii) lead switch means responsive to the liquid at a third level, intermediate of the first and second levels, in the container;
  (iv) first circuit means for supplying electrical energy from a source to said first and second motor means through said stop switch means and said lead switch means in series, so that initial energization of one of said first and second motor means as the liquid reaches the third intermediate level is accomplished by the closing of said stop switch means and said lead switch means in series, said first circuit means supplying electrical energy from the source to first relay means through said stop switch means and said lead switch means in series, so that initial energization of said first relay means as the liquid reaches the third intermediate level is accomplished by the closing of said stop switch means and said lead switch means in series, said first relay means upon energization latching closed normally open first relay contacts means in parallel with said lead switch means and in series with said stop switch means, whereby energization of one of said first and second motor means is maintained after initial energization thereof, even though the lead switch means may be opened after the energization of said first relay means, initial deenergization of said energized one of said first and second motor means being accomplished by the opening of said stop switch means; and
  (v) alternating means for alternately interconnecting alternate ones of said first and second motor means in series with said stop switch means and said normally open first relay contacts means, whereby alternating ones of said first and second motor means are energized, said alternating means including said first circuit means supplying electrical energy from the source through said stop switch means and said normally open first relay contacts means in series with RC circuit means for charging of capacitive means during energization of one of said first and second motor means, the RC circuit means being interconnected to bi-stable second relay means by normally closed first relay contacts means, said normally closed first relay contacts means being latched open during energization of said first relay means so as to be in an open state and being closed upon deenergization of said first relay means so as to be in a closed state, whereby said bi-stable second relay means is energized upon deenergization of said energized one of said first and second motor means, said bi-stable second relay means being interconnected to means for switching said first circuit means to an alternate one of said first and second motor means upon energization of said bi-stable second relay means.

2. An apparatus in accordance with claim 1, wherein said bi-stable second relay means is interconnected to second relay contacts means, said bi-stable second relay means latching closed said second relay contacts means in a first stable state and latching open said second relay contacts means in a second stable state, said second relay contacts means when latched closed supplying electrical energy from the source to third relay means whereby said third relay means is energized, said third relay means closing normally open third relay contacts means upon being energized, said third relay contacts means interconnecting one of said first and second motor means in series with said stop switch means and said lead switch means when closed, and interconnecting the other of said first and second motor means in series with said stop switch means and said lead switch means when open so as to alternate said first and second motor means.

3. An apparatus in accordance with claim 1, wherein the lead switch means and the stop switch means comprise mercury switches.

4. An apparatus in accordance with claim 1, wherein said first circuit means supplies electrical energy from the source to said first and second electric motor means through said stop switch means and said lag switch means in series so that initial energization of the unenergized one of said first and second electric motor means as the liquid reaches the second level is accomplished by closing said lag switch means in series with said stop switch means, whereby both of said first and second motor means are energized.

5. An apparatus in accordance with claim 4, wherein the stop switch means and the lag switch means are interconnected in series with fourth relay means, said fourth relay means being energized upon closing said stop switch means and said lag switch means, said fourth relay means upon energization latching closed normally open fourth relay contacts means which is in parallel with said lag switch means and in series with said stop switch means, said fourth relay means upon energization further latching closed normally open fourth relay contacts means for interconnecting said first and second electric motor means so as to place said first and second electric motor means in series with said stop switch means and said lead switch means.

6. Control apparatus for alternately operating one of first and second electrical load devices; comprising:
  (a) first switch means, second switch means, and third switch means to be closed and opened in predetermined sequences;
  (b) first circuit means for supplying electrical energy from a source to a first relay means and one of said first and second electrical load devices through both said first and second switch means in series, the first relay means having normally open first relay contacts means, said normally open first relay contacts means being latched closed upon energization of said first relay means;
  (c) second circuit means for supplying electrical energy from the source through said first switch means and said normally open first relay contacts means to one of said first and second electrical load devices when the first relay means is energized; and
  (d) third circuit means for supplying electrical energy from the source through said first switch means and said normally open first relay contacts means to RC circuit means interconnected to bi-stable relay means by normally closed first relay contacts means, said normally closed first relay contacts means being latched open upon energization of said first relay means whereupon said bi-stable relay means is made to change states when said first switch means is opened, said bi-stable relay means in a first state interconnecting a first one of said first and second electrical load devices to said first circuit means, and in a second state interconnecting a second one of said first and second electrical load devices to said first circuit means.

* * * * *

UNITED STATES PATENT AND TRADEMARK OFFICE
CERTIFICATE OF CORRECTION

PATENT NO. : 4,652,802

DATED : March 24, 1987

INVENTOR(S) : Stephen P. Johnston

It is certified that error appears in the above-identified patent and that said Letters Patent is hereby corrected as shown below:

Column 2, Line 66, "." should be --;--.

Column 3, Line 47, "inter connected" should be --interconnected--.

Signed and Sealed this

Twenty-fifth Day of April, 1989

Attest:

DONALD J. QUIGG

Attesting Officer     Commissioner of Patents and Trademarks